(12) United States Patent
Käbisch et al.

(10) Patent No.: US 11,144,710 B2
(45) Date of Patent: Oct. 12, 2021

(54) DEVICE WITH COMMUNICATION INTERFACE AND METHOD FOR CONTROLLING DATABASE ACCESS

(71) Applicants: Sebastian Käbisch, Augsburg (DE); Daniel Peintner, Meransen Mühlbach (IT)

(72) Inventors: Sebastian Käbisch, Augsburg (DE); Daniel Peintner, Meransen Mühlbach (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 849 days.

(21) Appl. No.: 15/512,997

(22) PCT Filed: Aug. 12, 2015

(86) PCT No.: PCT/EP2015/068512
§ 371 (c)(1),
(2) Date: Mar. 21, 2017

(87) PCT Pub. No.: WO2016/045863
PCT Pub. Date: Mar. 31, 2016

(65) Prior Publication Data
US 2018/0330111 A1    Nov. 15, 2018

(30) Foreign Application Priority Data
Sep. 22, 2014    (DE) .................... 102014219090.8

(51) Int. Cl.
*G06F 16/25*    (2019.01)
*G06F 40/143*    (2020.01)
(Continued)

(52) U.S. Cl.
CPC .......... *G06F 40/143* (2020.01); *G06F 16/252* (2019.01); *G06F 21/6218* (2013.01);
(Continued)

(58) Field of Classification Search
CPC .... G06F 16/10; G06F 16/955; G06F 17/2252; G06F 17/272; G06F 16/84; H04N 21/435; H04N 21/84; Y10S 707/99943
(Continued)

(56) References Cited

U.S. PATENT DOCUMENTS 7,668,885 B2 *  2/2010  Wittke .................... G06N 5/00
                                                            707/705
7,933,410 B2 *  4/2011  Fahrny ............... H04N 21/4623
                                                            380/201
(Continued)

FOREIGN PATENT DOCUMENTS

CN    102379087 A    3/2012
CN    102708106 A    10/2012

OTHER PUBLICATIONS

Efficient XML Interchange (EXI) Profile for limiting usage of dynamic memory, W3C Recommendtion, pp. 1-9;www.w3org/TR/2014/REC-exi-profile-20140909; 2014.
(Continued)

*Primary Examiner* — Alex Gofman
*Assistant Examiner* — Linh Black
(74) *Attorney, Agent, or Firm* — Lempia Summerfield Katz LLC

(57) ABSTRACT

The disclosure relates to a device that is set up for device-internal handling of data in a text format, that has a communication interface set up to interchange binary data, particularly EXI data, and that provides a coder for reciprocally converting the binary data into text format data, wherein the coder is set up to associate resource descriptions
(Continued)

with a respective identification number. This association is managed via a resource table, which is managed by the coder and in which a respective resource description in text form has an associated respective identification number. In addition, the device has at least one device-internal database for storing resources and the relationships between the resources. A database access control unit is provided that has access both to the database and to the resource table. Centralization of the resource table advantageously avoids redundant storage of resource descriptions.

17 Claims, 1 Drawing Sheet

(51) Int. Cl.
H03M 7/30 (2006.01)
G06F 40/146 (2020.01)
G06F 21/62 (2013.01)
(52) U.S. Cl.
CPC ............ G06F 40/146 (2020.01); H03M 7/30 (2013.01); H03M 7/707 (2013.01)
(58) Field of Classification Search
USPC .. 707/E17.112, E17.104, E17.105, E17.022, 707/E17.025, E17.058, E17.005, E17.006, 707/E17.124, 705, E17.031, E17.117, 707/E17.134, 798, 781–782, 785, 805
See application file for complete search history.

(56) References Cited

U.S. PATENT DOCUMENTS

| | | | | |
|---|---|---|---|---|
| 8,533,172 B2* | 9/2013 | Bellessort | ............. | G06F 40/143 707/705 |
| 8,886,628 B1* | 11/2014 | Taswell | ............. | G06F 16/955 707/707 |
| 8,914,718 B2* | 12/2014 | Denoual | ............. | G06F 40/149 715/242 |
| 2002/0001395 A1* | 1/2002 | Davis | ............. | G06F 21/10 382/100 |
| 2002/0156866 A1* | 10/2002 | Schneider | ............. | G06F 16/955 709/218 |
| 2003/0046317 A1 | 3/2003 | Cseri et al. | | |
| 2003/0158841 A1* | 8/2003 | Britton | ............. | G06F 16/90335 |
| 2004/0006575 A1* | 1/2004 | Visharam | ............. | H04N 21/84 |
| 2006/0269148 A1* | 11/2006 | Farber | ............. | G06Q 40/00 382/232 |
| 2006/0280166 A1* | 12/2006 | Morris | ............. | H04L 67/24 370/352 |
| 2007/0265055 A1* | 11/2007 | Berman | ............. | G07F 17/323 463/16 |
| 2008/0027981 A1* | 1/2008 | Wahl | ............. | G06F 16/258 |
| 2010/0083101 A1* | 4/2010 | Denoual | ............. | G06F 40/149 715/242 |
| 2010/0287460 A1* | 11/2010 | Denoual | ............. | G06F 40/149 715/234 |
| 2011/0055200 A1* | 3/2011 | Sovio | ............. | H04L 47/70 707/715 |
| 2011/0145700 A1* | 6/2011 | Tamiya | ............. | G06F 40/205 715/242 |
| 2011/0153531 A1* | 6/2011 | Ishizaki | ............. | G06F 17/2247 706/12 |
| 2011/0270895 A1* | 11/2011 | Shelby | ............. | G06F 40/146 707/803 |
| 2012/0124017 A1 | 5/2012 | Heuer | | |
| 2012/0254724 A1* | 10/2012 | Doi | ............. | G06F 17/272 715/234 |
| 2012/0254725 A1 | 10/2012 | Doi | | |
| 2013/0103721 A1* | 4/2013 | Doi | ............. | G06F 16/84 707/802 |
| 2014/0115104 A1* | 4/2014 | Heuer | ............. | G06F 8/427 709/217 |
| 2014/0288718 A1* | 9/2014 | Nishibayashi | ............. | G05B 19/0423 700/286 |

OTHER PUBLICATIONS

German Search Report for related German Application No. 10 2014 219 090.8 dated Jun. 29, 2015, with English Translation.

Kyusakov Rumen et al: "Efficient XML Interchange in factory automation systems"; IECON 2011—37thAnnual Conference on IEEE Industrial Electronics Society; pp. 4478-4483; XP032105168; DOI:10.1109/IECON.2011.6120046; ISBN: 978-1-61284-969-0.

Kyusakov Rumen et al: "Integration of Wireless Sensor and Actuator Nodes with IT Infrastructure UsingService-Architecture"; IEEE Transactions on Industrial Informatics; IEEE Service Center New York NY(US); Bd 9 Nr. 1; pp. 43-51; XP011482884; ISSN: 1551-3203; DOI: 10.1109/TII.2012.2198655.

PCT International Search Report and Written Opinion of the International Searching Authority dated Oct. 26, 2015 for corresponding PCT/EP2015/068512, with English Translation.

Wikipedia-Artikel: "Normalisierung (Datenbank)"; pp. 1-16;www.wikipedia.org/w/index.php?title=Normalisierung_%28Datenbank%29&oldid=134182981#Dritte_Normalform_.283NF.29; 2014.

European Summons to Oral Proceedings under Rule 115 (1) EPÜ for European Patent Application No. 15 750 992.8-1222 dated Oct. 15, 2019.

Snyder, Sheldon L. "Efficient XML Interchange (EXI) compression and performance benefits: development, implementation and evaluation" Naval Postgraduate School Monterey CA, Mar. 2010. pp. 1-2.

Chinese Office Action for Chinese Application No. 201580051086.3 dated Nov. 5, 2019.

"Triplestore", Wikipedia (Sep. 12, 2014). XP055666841. pp. 1-7. https://en.wi ki pedia. org/w/i ndex.php?title=Triplestore&old id =625227194.

European Result of Consultation for European Application No. 15 750 992.8-1222 dated Feb. 14, 2020.

* cited by examiner

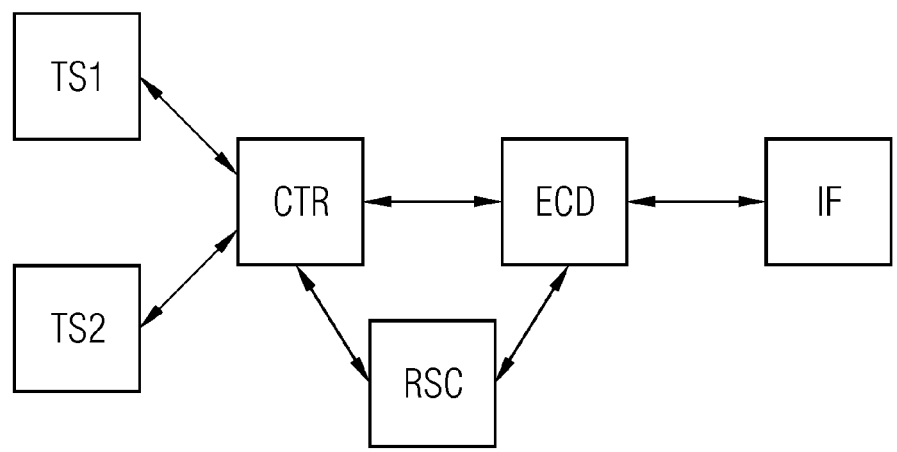

DEVICE WITH COMMUNICATION INTERFACE AND METHOD FOR CONTROLLING DATABASE ACCESS

CROSS-REFERENCE TO RELATED APPLICATIONS

This application is the National Stage of International Application No. PCT/EP2015/068512, filed Aug. 12, 2015, which claims the benefit of German Patent Application No. DE 102014219090.8, filed Sep. 22, 2014. The entire contents of these documents are hereby incorporated herein by reference.

TECHNICAL FIELD

The present embodiments relate to a device having a communication interface and to a method for controlling database access.

BACKGROUND

Description languages for specifying data formats and methods for processing data are known in the prior art. One known description language is "Extensible Markup Language" (XML). XML is used to describe hierarchically structured data in text form or plain text. XML is used for platform-independent interchange of data between computer systems. The textual nature of XML is readable both by machines and by human beings.

Frequently, fast data interchange between computer systems is to be provided and may not be achieved with a textual description language such as XML. Therefore, binary representations of XML have been proposed. A binary representation of XML (e.g., "Efficient XML Interchange" (EXI)) is faster to process in comparison with text-based XML data and uses less transmission bandwidth for the data interchange between computer systems. Use of EXI is incidentally not limited solely to a binary representation of XML. EXI may be used as an interchange format for transmitting any semistructured data.

The interchange format EXI exhibits particular advantages for use in XML-based applications when a microcontroller having limited memory space and computation power is used. Devices that operate using microcontrollers (e.g., intelligent sensors in a production line or in a vehicle) may be configured for device-internal processing of data in a text-based XML format, but may interchange data with one another via appropriate communication interfaces based on binary data (e.g., binary data according to EXI specifications).

Besides using a more compressed binary data transmission, the XML format also affords the advantage of referencing text-based resource descriptors with a compact identification number following a first transmission as a character string, and for a subsequent transmission, using the identification number instead of the text-based resource descriptors for denoting resources. This involves provision for maintenance of resource tables or "EXI string tables" on both sides of the transmission, allowing for an even more compact transmission of the EXI stream or EXI datastream between the two communication interfaces of the transmission partners.

The data to be transmitted using EXI may be extracted from a database of a communication partner based on a request. Subsequently, the EXI datastream is produced dynamically in a memory area. In the course of this production, updates are applied to the stored data on a case by case basis (e.g., by adding or erasing data). The data updated in this manner may then be converted into an EXI datastream by an encoder or EXI processor, where the EXI datastream is transmitted to the communication partner via a communication interface.

Only in the course of production of the EXI datastream is the transmitter-end resource table (e.g., "EXI string table") configured by the encoder. This ad hoc production of the EXI datastream and the resource table in the course of an enquiry disadvantageously uses increased memory space and computation power.

Producing the EXI datastream also has the disadvantage that both the resource table and the database store a plurality of resource descriptors in text form. The redundant memory space occupancy is disadvantageous when, for example, a microcontroller with limited memory space and computation power is used. Use of the EXI interchange format may attain a saving on required memory space.

SUMMARY AND DESCRIPTION

The scope of the present invention is defined solely by the appended claims and is not affected to any degree by the statements within this summary.

One or more of the present embodiments may obviate one or more of the drawbacks or limitations in the related art. For example, reduction in the memory space and computation power currently used for producing and interchanging binary data in a device configured for device-internal processing of data in a text format and having a communication interface configured for interchanging binary data is provided.

A device that is configured for device-internal processing of data in a text format and has a communication interface that is configured for interchanging binary data is provided. An encoder is provided for reciprocally converting binary data into text format data. The encoder is configured for associating resource descriptors with a respective identification number. This association is managed using a resource table managed by the encoder. A respective identification number is associated with a respective resource descriptor in text form. In addition, the device has at least one device-internal database for storing resources and the relationships thereof with one another.

According to one or more of the present embodiments, a database access control unit that has access to the database and to the resource table is provided. Centralization of the resource table may prevent redundant storage of resource descriptors.

One or more of the present embodiments provides for the database access control unit to be configured such that a resource to be stored is referenced based on the associated identification number instead of the resource descriptor.

Further, centralization of the resource table provides that the database only needs to store a respective identification number for referencing the resource. An identification number is stored in the integer data format (e.g., using far less memory in comparison with a resource descriptor that is to be stored as a character string). The disadvantageous redundant storage of the resource descriptor in the database and in the resource table is eliminated.

Computation complexity for comparing the resource descriptor in a parsing method or string comparison method is diminished. Creation of the binary data and substantial reduction of a response time for an enquiry is provided.

The computation complexity that the previously redundant data management required for performing the string comparison methods is diminished, and thus, the computation complexity previously necessary both upstream of the database access control unit for searching the database and at the encoder for searching the resource table is diminished.

One or more of the present embodiments are based on matching the data managed in the database to the EXI conventions as much as possible. Accordingly, data is stored in an EXI-related form in order to be able to use the advantages of EXI and to be able to react well to update and erasure operations.

A method is provided for controlling database access in a device configured for device-internal processing of data in a text format and having a communication interface that is configured for interchanging binary data. Interchanging binary data may be provided according to EXI specifications. The method includes accepting a request for storing a resource in a device-internal database. The request characterizes the resource based on a resource descriptor in a text format. The method also includes extracting an identification number associated with the resource to be stored from a resource table associated at least to some extent with an encoder. The method further includes storing the resource based on the associated identification number instead of the resource descriptor.

A computer program product having a computer program is executed in a processor to carry out the method discussed above. The computer program product includes a non-transitory computer-readable storage medium executable by the processor to carry out the method discussed above.

According to one or more embodiments, the method includes prompting, by a write access request, to extract a resource descriptor associated with the write access request, identifying an identification number associated with the resource descriptor in the resource table, and storing the associated identification number in a field provided in the database for the resource to be stored. A reduction in the number of parsing or string comparison operations to one operation may be provided. The remainder of the progression using the identification number as a reference to the resource.

According to one or more embodiments, a new entry is created in the resource table for a resource descriptor that is unidentifiable in the resource table. A new entry enters the unidentifiable resource descriptor as a new resource descriptor and associates the new resource descriptor with a new identification number. This configuration provides an additional load reduction for the encoder. Even before an enquiry after a resource, the encoder is relieved of the load of creating a new entry in the resource table at the time of generation of the EXI datastream.

According to one or more embodiments, the method includes prompting, by a read access operation, to extract the identification number associated with the resource to be read from the database and transferring the identification number to the encoder. This provides that a read access operation in the course of an enquiry may use the identification number that is advantageous for the encoder. The encoder is therefore relieved of the previously required task of extracting the identification number from the resource table at the time of generation of the EXI datastream using a computation-intensive parsing or string comparison operation.

According to one or more embodiments, there is provision for the resources and the relationships thereof to include at least one subject, at least one predicate and at least one object. This measure provides data management according to a "resource description framework" with further use of a database configured as a triple store.

According to one or more embodiments, there is provision for storing resources (e.g., particularly objects) containing a data value instead of a resource descriptor (e.g., as a data value with a description of the data type in the database). If the values of resources are not text data (e.g., an integer, floating point number or float, Boolean, etc.) type, then the resources are encoded by a standardized EXI type encoding format in "type-aware" fashion. More rapid and more memory-efficient processing of the resources may be provided in an EXI datastream by the encoder.

BRIEF DESCRIPTION OF THE DRAWINGS

FIG. 1 shows a schematic depiction of functional units of one embodiment of a device that are involved in data storage and data interchange via a communication interface.

DETAILED DESCRIPTION

FIG. 1 nonexhaustively shows functional units of a device. The device includes a first and a second device-internal database TS1, TS2, a database access control unit CTR, a resource table RSC, an encoder ECD, and a communication interface IF.

In addition, a resource table RSC is provided that may be read or written to via the database access control unit CTR and via the encoder ECD. In alternative embodiments, there may also be multiple resource tables provided (e.g., managed both by one of the database access control units CTR and by the encoder ECD). Access to the resource table(s) by the database access control units CTR and by the encoder ECD is a core advantage of one or more of the present embodiments. The prior art only has provision for managing a resource table RSC by the encoder ECD.

As depicted in FIG. 1, two databases TS1, TS2 are read and written to via a common database access control unit CTR. In alternative embodiments, any number of databases may be managed. Alternatively, the databases may be managed by a database access control unit associated with each respective database alone.

The data to be transmitted via the communication interface IF is extracted from a database TS1, TS2 by the database access control unit CTR based on a device-external or device-internal request. The data is transferred to the encoder ECD, which produces a binary datastream or EXI datastream and outputs the datastream to the communication interface IF.

According to one or more of the present embodiments, the database access control unit CTR that is more centralized is provided with access to both the databases TS1, TS2 and the resource table RSC. Centralization of the resource table RSC advantageously prevents redundant storage of resource descriptors.

The database access control unit CTR is configured such that a resource to be stored is referenced based on an associated identification number instead of the resource descriptor. In conjunction with the centralization of the resource table RSC, referencing based on an associated identification number provides that the databases only have to store a respective identification number for referencing the resource. An identification number is stored in the integer data format (e.g., requiring far less memory in comparison with a resource descriptor that is to be held as a character string). Redundant storage of the resource descriptor both in the databases TS1, TS2 and in the resource table RSC is therefore eliminated.

An exemplary resource table RSC is depicted below. The resource table RSC references a respective resource descriptor in text form. For example, in the table, "CH" represents the "character" and "ID" represents the identification number.

| Ch | ID |
|---|---|
| a | 1 |
| b | 2 |
| c | 3 |
| d | 4 |
| e | 5 |
| f | 6 |
| g | 7 |

In the exemplary resource table RSC depicted above, the resource descriptors a, b, c, d, e represent arbitrary character strings (e.g., in the form "temperature sensor" or "measures temperature value with a Kelvin Degree of").

The databases TS1, TS2 store resources and the relationships of the resources with one another. The organization of the stored data is based on a known data model called "resource description framework" or RDF. The data model RDF has formal semantics that are based on directional graphs. Data in RDF includes statements about resources. These statements are modeled as triples. The set of triples forms a graph. A triple is an elementary statement that includes of a subject, a predicate, and an object. For storing RDF triples in databases and data structures, designs are known as a triple store in specialist circles. An organization of triple stores differs from conventional database designs because storage of triples in a conventional database (e.g., relational table) is not efficient enough for many queries. In devices equipped with a microcontroller having limited memory space and computation power to offer, the triple store may also be referred to as µRDF.

Exemplary data records in the database TS1, TS2 configured as a triple store are depicted in the table below. The data records or triples include a subject (column S), a predicate (column P), and an object (column O).

| S | P | O (TA) |
|---|---|---|
| 1 | 2 | 3 (string) |
| 1 | 2 | 4 (string) |
| 1 | 5 | 22.3 (float) |
| 6 | 5 | 2.4 (float) |
| 6 | 2 | 7 (string) |

The resource descriptor is not stored exclusively in text form, as was customary in the prior art. The resource descriptor is stored in the form of an identification number associated with the resource descriptor, as depicted in the resource table shown above.

Based on the above data records, not all resources have associated identification numbers as a reference to the associated resource description. Resources (e.g., objects) containing a data value instead of a resource descriptor are stored in the above table as a data value with a description of the data type. The data type (e.g., integer, floating point number or float, Boolean, etc.) is indicated together with the object in the embodiment above (e.g., "TA" or "type-aware" in the table).

If a data type is defined as a character string (e.g., "string"), then the resource characterized by the data type corresponds to an identification number associated with the resource descriptor according to the resource table shown above.

In the table above, the following objects are entered in the order of the entries of the O column: 3 (string), a character string extractable from the resource table with the identification number "3"; 4 (string), a character string extractable from the resource table with the identification number "4"; 22.3 (float), a floating point number with the value 22.3; 2.4 (float), a floating point number with the value 2.4: and 7 (string), a character string extractable from the resource table with the identification number "7".

If the values of resources are not text data (e.g., of integer, floating point number or float, Boolean, etc.) type, then the resources are encoded by a standardized EXI type encoding format in "type-aware" fashion. This allows more rapid and more memory-efficient processing of the resources to be included in an EXI datastream by the encoder.

A subject (e.g., in the exemplary triple, see the third row) has a character string that corresponds to a character string for association according to the resource table having the identification number 1 (e.g., the exemplary resource description a). As a predicate, the data record has a character string that corresponds to a character string for association according to the resource table having the identification number 5 (e.g., the exemplary resource description e). As an object, the data record has a floating point number having the value 22.3. This object is thus ascertained without involving the resource table.

New resources to be included in the database are collated with existing resource descriptions and associated identification numbers in the resource table to prevent multiple entries of resource descriptions. If a new resource description to be included is not yet present in the resource table, then the new resource description is entered in the resource table with a new identification number.

Encoding the binary data performed by the encoder ECD takes a simple form, because all valid identification numbers serving as references to the resource description or resource do not have to be produced by the encoder on an ad hoc basis. Instead, references to the resource description or resource are already present in every single data record. This allows a much faster binary data encoding method.

The provision of a "central" resource table for shared access by the database access control unit CTR and by the encoder ECD does not prohibit multiple resource tables from being provided. For a larger volume of resource descriptors, it may be advantageous for values of attributes or elements to be entered in a first resource table and for the attribute names or element names to be entered in a second resource table. This distributed depositing is not inconsistent with the proposed principle of referencing resources using an explicit identification number.

In summary, the present embodiments relate to a device that is configured for device-internal processing of data in a text format and has a communication interface. The communication interface is configured for interchanging binary data (e.g., EXI data) and provides an encoder for reciprocally converting the binary data into text format data. The encoder is configured for associating resource descriptors with a respective identification number. This association is managed using a resource table (e.g., managed by the encoder) in which a respective identification number is associated with a respective resource descriptor in text form. In addition, the device includes at least one device-internal database for storing resources and the relationships of the resources with one another. According to one or more of the present embodiments, a database access control unit is provided that has access to both the database and to the resource table. Centralization of the resource table advantageously prevents redundant storage of resource descriptors. Further, the database access control unit is provided and configured such that a resource to be stored is referenced based on the associated identification number instead of the resource descriptor.

The present embodiments lead to faster reaction times for creating the EXI datastream when compared to the prior art. Close proximity to the representation of the actual interchange format EXI achieves efficient representation and handling of the data. Centralized management of the resource description leads to advantageous prevention of redundancies and a substantially reduced memory space requirement.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device having a communication interface, the device configured for device-internal processing of data in a text format, the communication interface configured for interchanging binary data according to Efficient XML Interchange (EXI) specifications, the device comprising:
    an encoder configured for reciprocally converting the binary data according to the EXI specifications into text format data, the encoder configured for associating resource descriptors with respective identification numbers;
    an EXI string table associated with the encoder, wherein the EXI string table identifies the resource descriptors in the EXI string table by the respective identification numbers;
    at least one device-internal database configured for storing resources and relationships of the resources; and
    at least one database access control unit having access to the at least one device-internal database and to the EXI string table,
    wherein the database access control unit is configured, by a prompt from a read access operation, to extract an identification number associated with a resource read from the at least one device-internal database and to transfer the identification number to the encoder,
    wherein the database access control unit is further configured to reference the resource read from the at least one device-internal database based on the associated identification number instead of the respective resource descriptor,
    wherein the database access control unit is further configured to store the identification number associated with the resource, and
    wherein the database access control unit is not configured to store the resource descriptor.

2. The device of claim 1, wherein the database access control unit is configured, by a prompt from a write access request, to extract a resource descriptor associated with the write access request, to identify an identification number associated with the resource descriptor in the EXI string table, and to store the associated identification number in a field provided in the at least one device-internal database for the resources to be stored.

3. The device of claim 2, wherein the database access control unit is configured to create a new entry in the EXI string table for a resource descriptor that is unidentifiable in the EXI string table, and
    wherein the new entry enters the unidentifiable resource descriptor as a new resource descriptor and associates the new resource descriptor with a new identification number.

4. The device of claim 1, wherein the text format is configured in an XML format.

5. The device of claim 1, wherein the resources and the relationships of the resources comprise at least one subject, at least one predicate, and at least one object.

6. The device of claim 1, wherein the at least one device-internal database is a triple store.

7. The device of claim 1, wherein a database storing resources comprises a data value,
    wherein the data value is not a resource descriptor, and
    wherein the data value comprises a description of a data type in the at least one device-internal database.

8. The device of claim 7, wherein the description of the data type is provided in an EXI type encoding format.

9. A method for controlling database access in a device configured for device-internal processing of data in a text format, the device comprising a communication interface configured for interchanging binary data according to Efficient XML Interchange (EXI) specifications, the method comprising:
    accepting a request for storing a resource in a device-internal database, wherein the request characterizes the resource based on a resource descriptor in a text format;
    extracting an identification number associated with the resource from an EXI string table associated with an encoder, wherein the EXI string table identifies the resource descriptors in the EXI string table with respective identification numbers, wherein a database access control unit of the device is prompted by a read access operation to extract the identification number associated with the resource from the device-internal database and to transfer the identification number to the encoder;
    referencing the resource based on the extracted identification number instead of the respective resource descriptor; and
    storing the resource based on the associated identification number, wherein the resource is not stored based on the resource descriptor.

10. The method of claim 9, wherein accepting the request prompts storing a data value in the device-internal database with a description of a data type.

11. A non-transitory computer-readable storage medium storing instructions executable by a database access controller to control database access in a device configured for device-internal processing of data in a text format, the device comprising a communication interface configured for interchanging binary data according to Efficient XML Interchange (EXI) specifications, wherein the instructions, when executed by the database access controller, are configured to cause the device to:

accept a request for storing a resource in a device-internal database, wherein the request characterizes the resource based on a resource descriptor in a text format;

extract an identification number associated with the resource from an EXI string table associated with an encoder, wherein the EXI string table identifies the resource descriptors in the EXI string table with respective identification numbers, wherein the database access controller is prompted by a read access operation to extract the identification number associated with the resource from the device-internal database and to transfer the identification number to the encoder;

reference the resource based on the extracted identification number instead of the respective resource descriptor; and store the resource based on the associated identification number, wherein the resource is not stored based on the resource descriptor.

12. The method of claim 10, wherein the description of the data type comprises an EXI type encoding format.

13. The device of claim 1, wherein the resources comprise objects.

14. The device of claim 2, wherein the text format is configured in an XML format.

15. The device of claim 2, wherein the resources and the relationships of the resources comprise at least one subject, at least one predicate, and at least one object.

16. The device of claim 2, wherein the at least one device-internal database is a triple store.

17. The device of claim 2, wherein a database storing resources comprises a data value,
wherein the data value is not a resource descriptor, and
wherein the data value comprises a description of a data type in the at least one device-internal database.

* * * * *